US011883364B2

(12) United States Patent
Brandenburger

(10) Patent No.: US 11,883,364 B2
(45) **Date of Patent: *Jan. 30, 2024**

(54) CONNECTION ASSEMBLY FOR DIRECTING A MEDICAL LIQUID

(71) Applicant: FRESENIUS KABI DEUTSCHLAND GMBH, Bad Homburg (DE)

(72) Inventor: Torsten Brandenburger, Reichelsheim (DE)

(73) Assignee: Fresenius Kabi Deutschland Gmbh, Bad Homburg (DE)

( * ) Notice: Subject to any disclaimer, the term of this patent is extended or adjusted under 35 U.S.C. 154(b) by 746 days.

This patent is subject to a terminal disclaimer.

(21) Appl. No.: 16/296,643

(22) Filed: Mar. 8, 2019

(65) Prior Publication Data

US 2019/0201289 A1 Jul. 4, 2019

Related U.S. Application Data

(63) Continuation-in-part of application No. 15/821,724, filed on Nov. 22, 2017, now Pat. No. 10,576,019, (Continued)

(30) Foreign Application Priority Data

May 22, 2015 (EP) .................................... 15168952

(51) Int. Cl.
*A61J 1/20* (2006.01)
*A61J 1/14* (2023.01)
*A61J 1/10* (2006.01)

(52) U.S. Cl.
CPC ........... *A61J 1/2055* (2015.05); *A61J 1/1406* (2013.01); *A61J 1/1481* (2015.05); *A61J 1/20* (2013.01); *A61J 1/10* (2013.01); *A61J 1/1425* (2015.05)

(58) Field of Classification Search
CPC ...... A61J 1/2055; A61J 1/2048; A61J 1/2058; A61J 1/2006; A61J 1/20; A61J 1/2003;
(Continued)

(56) References Cited

U.S. PATENT DOCUMENTS 7,967,797 B2 6/2011 Winsor et al.
8,025,646 B2 9/2011 Fukai et al.
(Continued)

FOREIGN PATENT DOCUMENTS

CN 102164628 B 3/2016
EP 1217284 B1 2/2009
(Continued)

OTHER PUBLICATIONS

International Search Report and Written Opinion issued in PCT/IB2020/051987, dated Apr. 20, 2020.

*Primary Examiner* — Philip R Wiest
(74) *Attorney, Agent, or Firm* — Blank Rome LLP

(57) ABSTRACT

A sealing element is received between a connector and an attachment member. The sealing element includes a foot section received by a recess of the connector, a shoulder engaging an inner surface of the attachment member, and a flange engaging a support surface of the connector. The sealing element also includes a cylindrical body extending from the shoulder to the flange along an insertion direction and, where the cylindrical body deforms to create a flow path through the sealing element, and a sealing head defines an opening that transitions from a closed state to an open state when the cylindrical body deforms.

28 Claims, 11 Drawing Sheets

Related U.S. Application Data which is a continuation of application No. PCT/EP2016/061582, filed on May 23, 2016.

(58) Field of Classification Search
CPC .......... A61J 1/10; A61J 1/1481; A61J 1/1406; A61J 1/1425
See application file for complete search history.

(56) References Cited

U.S. PATENT DOCUMENTS

| | | | | |
|---|---|---|---|---|
| 8,343,113 | B2 | 1/2013 | Hokanson | |
| 8,585,674 | B2 | 11/2013 | Brandenburger et al. | |
| 9,095,500 | B2 | 8/2015 | Brandenburger et al. | |
| 10,576,019 | B2 * | 3/2020 | Brandenburger | A61J 1/2096 |
| 2003/0141477 | A1 | 7/2003 | Miller | |
| 2006/0206059 | A1 * | 9/2006 | Lopez | A61M 5/14 604/249 |
| 2006/0211996 | A1 | 9/2006 | Trinchera et al. | |
| 2008/0009783 | A1 * | 1/2008 | Branderburger | A61M 39/20 604/30 |
| 2008/0190485 | A1 | 8/2008 | Guala | |
| 2010/0298782 | A1 | 11/2010 | Winsor et al. | |
| 2011/0166532 | A1 * | 7/2011 | Brandenburger | A61J 1/2096 604/201 |
| 2011/0282302 | A1 * | 11/2011 | Lopez | A61M 39/16 604/247 |
| 2014/0075756 | A1 | 3/2014 | Winsor et al. | |
| 2015/0297454 | A1 | 10/2015 | Sanders | |
| 2016/0030730 | A1 | 2/2016 | Mosler et al. | |
| 2016/0114147 | A1 * | 4/2016 | Siopes | A61M 39/06 604/256 |
| 2018/0092807 | A1 | 4/2018 | Brandenburger | |
| 2020/0046608 | A1 | 2/2020 | Brandenburger et al. | |

FOREIGN PATENT DOCUMENTS

| | | | |
|---|---|---|---|
| EP | 1470352 | B1 | 9/2012 |
| WO | 9311828 | A1 | 6/1993 |
| WO | 9826835 | A1 | 6/1998 |
| WO | 2005037362 | A1 | 4/2005 |
| WO | 2006103792 | A1 | 10/2006 |
| WO | 2010034470 | A1 | 4/2010 |
| WO | 2010151507 | A1 | 12/2010 |
| WO | 2016188957 | A1 | 12/2016 |
| WO | 2018065596 | A1 | 4/2018 |

* cited by examiner

CONNECTION ASSEMBLY FOR DIRECTING A MEDICAL LIQUID

CROSS-REFERENCE TO RELATED APPLICATION

This application is a continuation-in-part of U.S. patent application Ser. No. 15/821,724, filed Nov. 22, 2017, which is a continuation of International Patent Application PCT/EP2016/061582, filed May 23, 2016, which claims priority to foreign European Patent Application No. EP 15168952.8, filed May 22, 2015, the disclosures of which are each incorporated herein by reference as if set forth in their entireties herein.

TECHNICAL FIELD

This disclosure relates to a connection assembly configured to deliver a liquid. In particular, the present disclosure relates to a connection assembly including a deformable sealing element for providing needle-free access to the container.

BACKGROUND

In the medical field, liquids can often be stored in containers such as flexible bags, ampules, or bottles before being supplied to a patient. Connection assemblies, or connectors, can be used to direct the liquid into the container or remove the liquid from the container.

Such connectors are used, for example, to create so-called needle-free access to a container that holds liquid in order to fill the container with liquid or remove liquid from the container via the access. Such needle-free access provides entry to the container using a delivery device that has no injection needle. Instead, a connecting piece for a delivery device in the form of a syringe, for example, is incorporated into a slot opening of a sealing element in order to open the slot opening in this manner and allow flow between the delivery device and the container. By using needle-free access, the risk of injury in particular, which would otherwise be present when using injection needles, can be reduced.

Connectors are also important in container sterilization. Even if the sealing element provided is already sterile, legal requirements can make it necessary to wipe or dab off the outside of the delivery device before attaching the delivery device to the attachment member. This should ensure access to a container, for example, under sterile conditions.

The object of the present invention is to provide a connection assembly to guide a liquid which is reliably secured but which also allows a certain mobility of the sealing element. The flow, in particular should not be significantly affected by this. Another object of the present invention comprises a connection assembly in which the wiping or dabbing off of the sealing element for the purpose of disinfection is made possible. A further object of the present invention is to provide a connection assembly allowing needle-free container access.

SUMMARY

The present disclosure relates to a connection assembly for directing a liquid. The connection assembly includes a connector through which a liquid is delivered and an attachment member attached to a connector which can be connected to a delivery device for delivering a liquid through the connector. The attachment piece can have an opening that engages with the connector when the attachment member is attached to the connector. The connection assembly also includes a sealing element for sealing the transition between the connector and the attachment member. The sealing element can be inserted into the opening of the attachment member in an insertion direction in such a manner that the sealing element is held on the attachment member and is attached to the connector between the attachment member and the connector. In particular, the interior of the sealing element can be free of any body having a point that is intended to support the opening of the sealing element.

The sealing element has a sealing head that seals off the opening of the attachment member from liquid passage when the attachment member is attached to the connector. The sealing element also has a body adjoining the sealing head that can be spaced a radial distance from the attachment member when the sealing element is attached to the attachment member and the connector. The sealing element can further have a shoulder at the transition between the sealing head and the body that projects radially with respect to the insertion direction through the sealing head and along the insertion direction. This shoulder can be brought into contact with a contact surface inside the opening of the attachment member.

Also, the sealing element can have a flange that protrudes along the insertion direction and extends radially outward away from the body of the sealing element a distance greater than that of the shoulder. The flange can be held or clamped between the attachment member and the connector when the attachment member is attached to the connector.

The sealing element is held between the attachment member and the connector when the attachment member is attached to the connector in such a manner that the flange of the sealing element rests with its lower side on a contact surface of the connector and its upper side at least partially exposed. The sealing element has a foot section which, when viewed in an axial direction along an insertion direction, extends from the body below the flange and engages a recess defined by the connector. The sealing element is thus held between the attachment member and the connector in a clamping manner when the attachment member is attached to the connector so that a transition between the attachment member and the connector is sealed in a liquid-tight manner. The shoulder of the sealing element surrounds an insertion assembly and protrudes radially towards the outside past the sealing head and—when the attachment member is attached to the connector—rests on an associated support surface of the attachment member. The sealing element is thus supported by the shoulder axially along the insertion direction so that the sealing element is axially fixed relative to the attachment member. The diameter of the sealing element in the area of the shoulder can be within a range of 4 mm to 10 mm, or 6 mm to 8 mm. Since the sealing element is supported on one side by the shoulder and on the other by its flange and the foot section, a defined, secured placement of the sealing element within the opening of the attachment member can be guaranteed.

The body of the sealing element can be cylindrically formed. The sealing element as a whole can have a preferably rotationally symmetrical form, where different sections of the sealing element can have different diameters. The body of the sealing element, which connects to the shoulder, can be arranged with radial play in the opening of the attachment member so that a space can be defined inside the opening of the attachment member between the sealing element and the attachment member. This space can allow the sealing element to be deformed if a delivery device is attached to the attachment member. Because a space is defined in which the sealing element can be pushed aside if a delivery device, such as a syringe with a connector, is connected to the sealing element, a slot opening defined through the sealing head of the sealing element can be reliably opened. Accordingly, unhindered flow through the sealing element between the delivery device and the connector becomes possible when the slot opening is in an opened state.

The flange that protrudes radially from the sealing element connects to the body of the sealing element. When the attachment member is attached to the connector, the flange of the sealing element is fixed or held in a clamping manner between the attachment member and the connector. However, the flange itself is not clamped. This indirect clamped mounting of the flange is accomplished by the fact that the sealing element is supported by contact between the flange and/or foot section of the sealing element and the connector on a lower side and by contact between the shoulder of the sealing element and the attachment member on an upper side. The flange thus can rest with only its lower side on a contact surface of the connector and its upper side partially or completely exposed. The sealing element is thus fixed between the attachment member and the connector via the flange, where the flange can be located at the end of the body opposite the shoulder. The diameter of the flange of the sealing element can be greater than the shoulder. The diameter of the flange can be within a range of 5 mm to 11 mm, or 7 mm to 9 mm. Since the flange itself is not directly clamped, the sealing element thus retains a certain flexibility. As a result, the sealing head can first be pushed down into the sealing element by the syringe connector of the syringe when the syringe is connected to the connector, thus causing the side wall of the sealing element to radially deflect. The sealing element can then be opened when the connector presses the syringe into a slot opening that extends through the sealing head. In particular, the radial compensation movement of the side wall can be supported by the movable arrangement of the flange.

In one embodiment, a radial outer section of the flange can initially be held in a clamping manner when the attachment member is attached to the connector. In particular, the flange can be disposed between a contact surface of the connector and a projection of the attachment member that protrudes radially inwards into the opening of the attachment member. In one embodiment, the projection of the attachment member can be an annular projection. The annular projection can extend fully or only partially over the periphery of the sealing element. The sealing element can thus be placed within the annular projection, for example completely inside the opening, where the annular projection of the body projects radially inward into the opening and can be held at a radial distance from the outer walls of the attachment member that surrounds the opening. The annular projection can thus cause a partially clamped fixing of the sealing element between the attachment member and the connector. In addition, the annular projection can support the centered placement of the sealing element inside the opening with a radial distance between the sealing element and the walls of the attachment member that surround the sealing element. In a further embodiment, the connection between the connector and the attachment member can also be provided by the annular projection.

The sealing element can be formed with a convex outer side that faces away from the connector when the attachment member is attached to the connector. Alternatively, the outer side of the sealing element can be substantially flat or curved concavely inwards. The outer side can in particular be in a state in which a delivery device can be connected to a portion of the attachment member projecting outward from the attachment member or flush with a surface of the attachment member so that, before attachment of the delivery device occurs, the outer side of the sealing element can be easily accessed from the outside and wiped or dabbed off in order to sterilize it. The attachment member in this case can have a detachable part that is integrally associated with another section of the attachment member connected to the connector in an initial state. The detachable portion of the attachment member can be separated from this section, in particular broken off, to connect a delivery device to the attachment member. When the detachable part is removed from the rest of the attachment member, the outer side of the sealing element can protrude upwards so that the outer side can be wiped or dabbed off from the outside. The connection assembly, and in particular also the outer side of the sealing element, can be provided in a sterile condition even in its initial state before breaking off the detachable part. The outer side of the sealing element is formed on the sealing head of the sealing element. If, for example, a detachable part is removed from the attachment member, essentially only the outer side of the sealing element is exposed and projects, for example, outwardly in a convexly curved manner and can be wiped or dabbed off in a simple, reliable manner. The upper or outer side of the sealing head can have a diameter within a range of 3 mm to 7 mm, or from 4 mm to 6 mm.

The shoulder of the sealing element is preferably located on an end of the sealing head facing away from the outer side. In the case of the connector according to the invention, no hollow body having a point intended to support the opening of the membrane is provided. No body or hollow body having a point is provided that is arranged in the interior of the sealing element and intended to support the opening of the sealing head.

According to a further embodiment, a preferably cylindrical section when viewed axially in the insertion direction joins to the sealing head and merges into the shoulder which projects radially outward over the cylindrical section. This cylindrical section preferably has a larger diameter than that of the sealing head. The cylindrically formed body can further join to the shoulder, again seen axially along the insertion direction, where the shoulder protrudes radially outward over the body. In addition, the body can have a recess in its outer side at a transition to the flange, which can be provided by means of or as a step. In one embodiment, there is only a single step in the body of the sealing element. With this, the radial compensating movement of the sealing element when the syringe is connected is supported, for example, by a kind of bulge. In cross-section, the recess can have an essentially flat bottom. The recess can, for example, have a quadrangular cross section. In this case, the base and the radial opening of the recess can have essentially the same dimensions.

A foot section of the sealing element, which protrudes from the flange in the insertion direction when viewed axially along the insertion direction, can extend from the flange and engage an associated recess defined by the connector when the attachment member is attached to the connector. An advantageous connection between the sealing element and the connector is thus created at a defined position of the sealing element within the opening of the attachment member. The sealing element can thus be supported by its shoulder on one side of the body and by its flange and/or foot section on the other side. The sealing element can have a total height within a range of 6 mm to 15 mm, or within a range of 9 mm to 12 mm.

The sealing element can have a slot opening defined by the sealing head which, when the attachment member is attached to the connector, can be closed off from liquid passage therethrough. By joining the delivery device to the attachment member, the slot opening can be opened in such a way that a liquid can be conveyed through the slot opening. By using such a slot opening, needle-free access is created through the sealing element, by means of which, for example, a container connected to the connector can be accessed when using a delivery device which has no hypodermic needle.

The delivery device can, for example, be fitted with a connector configured to engage the sealing element for the purpose or providing needle-free access through the sealing element. The connector, through the application of pressure on the sealing element, can shift the upper side of the sealing element down and be pressed into the slot opening, which opens the sealing element to create a flow path for liquid. The delivery device then extends itself when it is fully attached—for example, screwed on tight, preferably to the connector through the slot opening of the sealing element—so that there can be an unhindered flow between the delivery device and the container through the sealing element. In one embodiment, at least 80%, or at least 90%, of the opening cross section in the delivery device through which the liquid is transported is exposed and is thus not covered by the sealing element. In another embodiment, the whole cross section of the opening in the delivery device through which the liquid is transported can be exposed.

The attachment member can be formed in a single piece as a plastic molded part. In one embodiment, the attachment member is injection-molded, though other manufacturing methods are contemplated. The attachment member according to the present disclosure has a first section and a detachable part. The opening in which the connector engages the attachment member can be formed in the first section. In an initial state of the attachment member, the detachable part is joined to the first section. The detachable section can be removed, in particular broken off, from the first section in order to connect a delivery device to the attachment member. The sealing element is held on the first section and seals off the opening of the first section from the outside when the detachable part is broken off. The outer side of the sealing element, in this case, faces towards the outside and can project through the first section towards the outside. Alternatively, the outer side of the sealing element is flush with the first section. In one embodiment, the attachment member provides a female Luer fitting, though other fittings are contemplated.

In one specific embodiment, the first section of the attachment member is formed by a connection section that can be attached to the connector, as well as a threaded portion connecting to the connection section. The threaded portion can have at least half threading for enabling a threaded connection with the delivery device. The threaded connection can further be provided by double threads. In this manner, a so-called Luer-lock connection is provided, by which a connection element in the form of a union nut can be connected to a delivery device, for example a Luer-lock syringe, to create a Luer-lock connection. In its initial state, the detachable part is connected to the threaded portion, and in this manner seals off the attachment member from the outside. To connect the delivery device to the attachment member, the detachable part of the attachment member can be removed from the threaded section (broken off, for example), so that the delivery device can be brought into connection in a screwing manner with the threaded portion via its connection element.

The threaded portion and the detachable part can be integrally formed such that they are integral in the initial state and together define a single piece. Between the threaded portion and the detachable part, a predetermined breaking point can be provided. In one embodiment, the predetermined breaking point takes the form of a circumferential notched recess, which can enable the defined removal of the detachable part from the threaded portion along a line specified by the predetermined breaking point.

The sealing element can be situated with its sealing head in an engagement opening of the threaded portion so that essentially only the outer side of the sealing head is accessible from the outside. If the outer side projects over the threaded portion towards the outside or terminates flush with the upper side of the threaded portion, the outside of the sealing element can be advantageously wiped or dabbed off from the outside in order to attach a delivery device to the attachment member and connect it to the connector under sterile conditions.

A head of the connector can be configured to be disposed in the opening of the attachment member when the attachment member is attached to the connector. In this case, the connector can be joined by a positive-lock connection to the attachment member in which, for example, a circumferential positive-lock element, such as a circumferential annular projection on the head of the connector, engages with an associated positive-lock element on the attachment member. In this manner, the connector can be axially secured to the attachment member. In addition, one or more positive-lock elements can be provided on the head of the connector to create a rotationally stable attachment of the attachment member to the head. To do this, for example, one or more webs extending parallel to the insertion direction and/or several grooves parallel to the insertion direction can be provided on the head of the connector to which the complementary positive-lock elements on the attachment member engage when the attachment member is attached to the connector. As such, the attachment member can be fixed by this engagement in a rotationally stable manner to the connector.

In one embodiment, the connection assembly and/or the sealing element can be components of a container for liquids. In this case, the connector is connected to the container and provides access to the container. By using an attachment member that can be attached to the connector and/or integrated into the connector, which can include the sealing element, a delivery device can be connected to the connector in order to convey a liquid into a container or out of the container.

A sealing element for an embodiment of the connection assembly described above and/or the connector described above is also within the scope of the invention. The sealing element can include a sealing head and a body connected to the sealing head, where the sealing element has a shoulder which projects radially over the sealing head with respect to the insertion direction and can be configured to be brought into contact with an associated support surface inside the opening of a connector in the insertion direction. The sealing element can also include a flange that projects radially outward and is spaced a distance from the shoulder along the insertion direction. The flange and can be held in a clamping manner with the connector on a side facing away from the body of the sealing element. The flange can lie with its lower side lying on a head of the connector and its upper side at least partially exposed. In addition, a foot section which, viewed in an axial direction along the insertion direction, connects to the body underneath the flange, can engage an associated recess defined by the head of the connector when the attachment member is connected to the connector.

Also within the scope of the invention is an arrangement that includes an embodiment of the connection assembly described above or an embodiment of the sealing element described above that has a connector to attach to an attachment member, where a delivery device attached to the attachment member of the connector penetrates the slot opening of the sealing element.

The connection assembly can alternatively be a component of a connector to which medical lines can be connected. For example, the connection assembly can be a component of a so-called y-connector, to which two lines and, through the attachment member, also a delivery device can be connected.

An embodiment of the present disclosure is sealing element configured to be received between a connector and an attachment member. The sealing element includes a foot section configured to be received by a recess of the connector, a shoulder configured to engage an inner surface of the attachment member, and a flange configured to engage a support surface of the connector. The sealing element also includes a cylindrical body extending from the shoulder to the flange along an insertion direction and configured to deform to create a flow path through the sealing element, and a sealing head defining an opening that is configured to transition from a closed state to an open state when the cylindrical body deforms.

Another embodiment of the present disclosure is a connection assembly configured to deliver a liquid from a delivery device to a container. The connection assembly includes a connector having a head that defines a recess and a support surface, wherein the connector is configured to connect to the container, and an attachment member comprising an inner surface, a lumen, a first end configured to be connected to the delivery device, and a second end connected to the connector. The connection assembly also includes a sealing element disposed in the lumen between the connector and the attachment member, where the sealing element includes a foot section configured to be received by the recess of the connector, a shoulder configured to engage the inner surface of the attachment member, and a flange configured to engage the support surface of the connector. The sealing element also includes a cylindrical body extending from the shoulder to the flange along an insertion direction and configured to deform to create a flow path through the sealing element, and a sealing head defining an opening that is configured to transition from a closed state to an open state when the cylindrical body deforms.

BRIEF DESCRIPTION OF THE DRAWINGS

The idea underlying the invention is clarified below on the basis of the exemplary embodiment described in the figures. Shown are.

DETAILED DESCRIPTION OF ILLUSTRATIVE EMBODIMENTS

Figure 1:
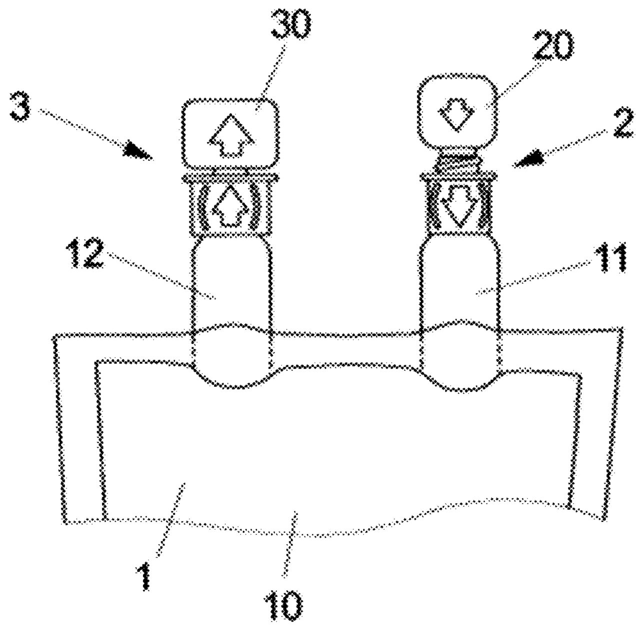
FIG. 1 is a front view of an upper portion of a container in the form of a bag with connectors arranged on it to which attachment members are attached according to an embodiment of the present disclosure.

Referring to FIG. 1, a container 1 is shown. Though the container 1 depicted takes the form of a flexible bag, other types of containers are contemplated, such as ampules or bottles. The container 1 comprises a bag body 10 for receiving a liquid, for example a medicine, a saline solution, a nutrient solution, or the like. The liquid can be stored in container 1, where liquid can be filled into the container 1 or removed from the container 1 via first and second connectors 11, 12.

First and second connectors 11, 12 provide access to the container 1 for adding or removing the liquid from the container 1. In the illustrated exemplary embodiment, the first connector 11, is designed to allow, together with attachment member 2, connection of delivery device 5 in the form of a syringe (shown in greater detail in FIGS. 12A and 12B), so that a liquid component can be delivered into the container 1 via the first connector 11. The second connector 12, however, together with attachment member 3, provides an access by which an infusion set, for example, can be connected to the container 1 in order to supply a liquid from the container 1 to a patient.

Figure 2:
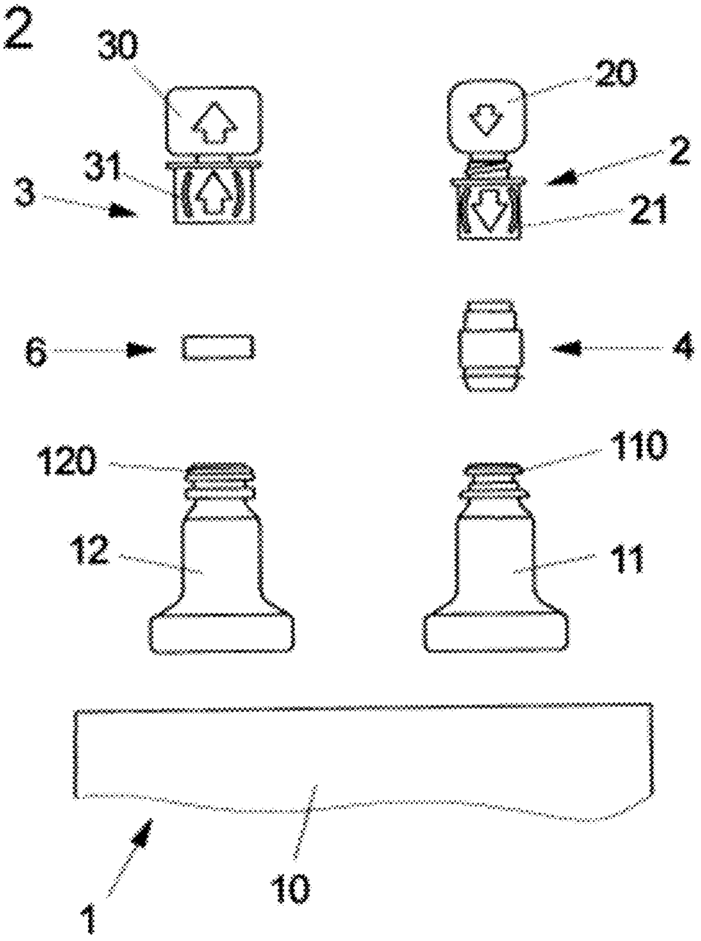
FIG. 2 is an exploded view of the connector and the attachment members shown in FIG. 1, with sealing elements arranged therebetween.
Figure 3:
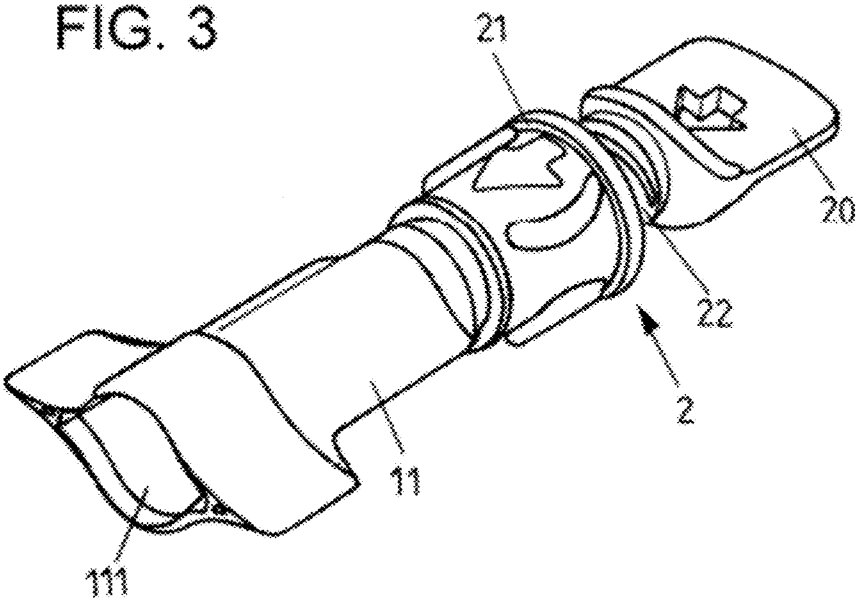
FIG. 3 a perspective view of a connector shown in FIG. 1, with an attachment member attached.
Figure 4:
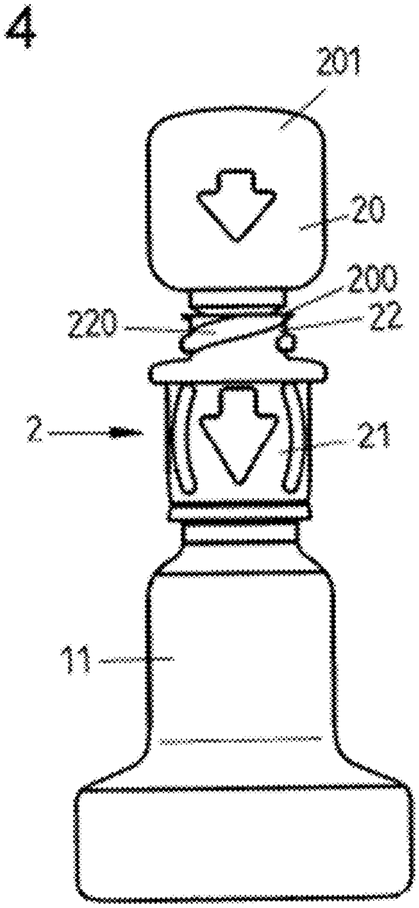
FIG. 4 is a front view of the connector and attachment member shown in FIG. 3.

FIG. 2 shows an exploded view of the connection assemblies formed by first and second connectors 11, 12, attachment members 2, 3 and associated sealing elements 4, 6, where the sealing element 4 is disposed between the first connector 11 and the attachment member 2, and the sealing element 6 is disposed between the second connector 12 and the attachment member 3. During formation of the container 1, the first and second connectors 11, 12 are to be placed between sheets to create the container 1 and are welded to the sheets so that connectors 11, 12 are integrally bonded to the sheets. Attachment members 2, 3 are then attached to the first and second connectors 11, 12 to complete the container 1, so that the sealing elements 4, 6 are located between the attachment members 2, 3 and connectors 11, 12. In this manner, the transition between attachment members 2, 3 and the first and second connectors 11, 12 comprises a liquid-tight seal.

Figure 12A:
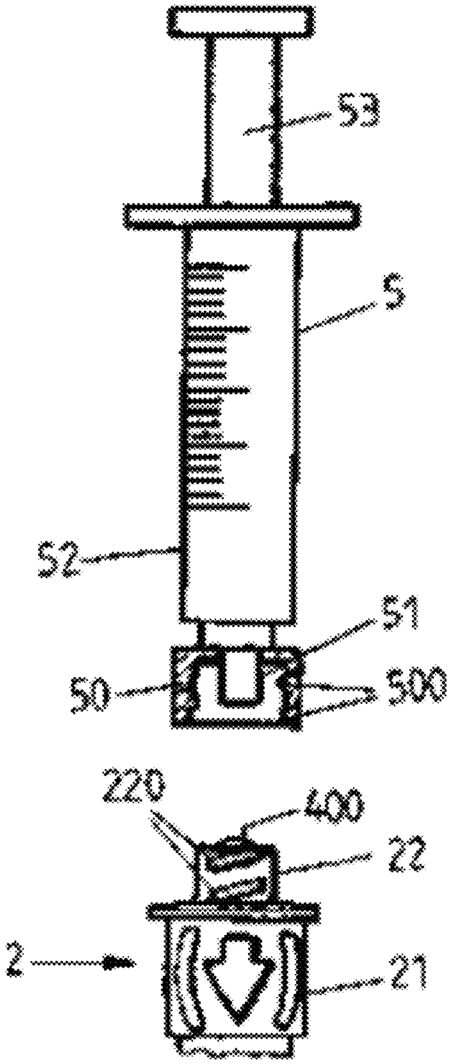
FIG. 12A is a side view of a delivery device and a connector according to an embodiment of the present disclosure.

Each attachment member 2, 3 has a respective detachable part 20, 30 that can be broken off from the rest of the attachment member 2, 3 to allow access to the container 1. The detachable part 20 can be broken off from the attachment member 2 in order to allow the attachment of a delivery device 5 to the attachment member 2 to provide liquid to the container 1. In one embodiment, the delivery device 5 can take the form of a syringe (as shown in FIG. 12A), though other delivery devices are contemplated. Likewise, the detachable part 30 can be broken off from attachment member 3 in order, for example, to insert a portion of a delivery device through the sealing element 6 and remove the liquid from the container 1 through the sealing element 6 in order to supply the liquid to a patient. In one embodiment, this delivery device is an infusion set comprising a spike, though other delivery devices are contemplated.

Each of the attachment members 2, 3 also has a respective connection section 21, 31. The connection section 21 can be brought into engagement with the connector 11 so as to create a positive lock connection between the attachment member 2 and the connector 11. Likewise, the connection section 31 can be brought into engagement with the connector 12 so as to create a positive lock connection between the attachment member 3 and the connector 12. The connection defined between the first connector 11 and the attachment member 2 attached thereto will be explained below.

FIGS. 3 to 11 show an exemplary embodiment of a connection formed by the connector 11 and attachment member 2. The connector 11 is, as previously described, bonded to sheets comprising the container 1 and is thus incorporated in an integral manner between the sheets. The attachment member 2 can be attached to connector 11 so that, in its attached position, attachment member 2 is held in a positive-lock manner on connector 11. The attachment member 2 has a first section comprising a connection section 21 and a threaded portion 22, which connects to it, as well as the detachable part 20. The attachment member 2 is formed in one piece as a plastic molded part and, in its initial state, comprises each of the detachable part 20, the connection section 21, and the threaded portion 22 integrally connected.

The connector 11 has a flow opening 111, which is closed to the outside by the attachment member 2 when the attachment member 2 is attached to the connector 11. As a result of this attachment, the attachment member 2 prevents liquid from leaving or entering the container 1. As is visible from the sectional view according to FIG. 5, when the attachment member 2 is attached to the connector 11, a head 110 of the connector 11 is disposed through an opening 210 of the connection section 21 of the attachment member 2. To axially secure the connector 11 to the attachment member 2, the connector 11 can include a circumferential positive-lock element in the form of annular projection 115. Further, the connector 11 can also include positive-lock elements 116, 117 that define axially extending webs and grooves that cause the connector 11 to be attached in a rotationally stable manner to attachment member 2. Within the opening 210 of the connection section 21 of the attachment member 2, the attachment member 2 can include complementary positive-lock elements (not shown) in the form of, for example, annular recesses that are configured to engage with annular projection 115. The attachment member 2 can also include axially extending webs and/or grooves defined within the opening 210 that are configured to engage positive-lock elements 116, 117.

Figure 7:
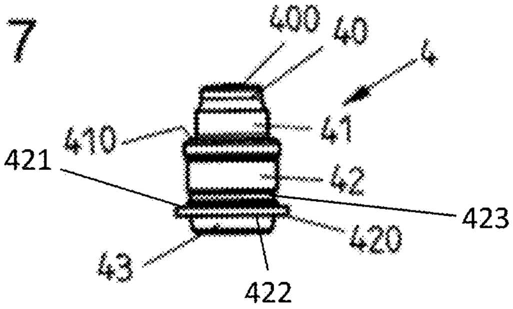
FIG. 7 is a front view of a sealing element according to an embodiment of the present disclosure.
Figure 8A:
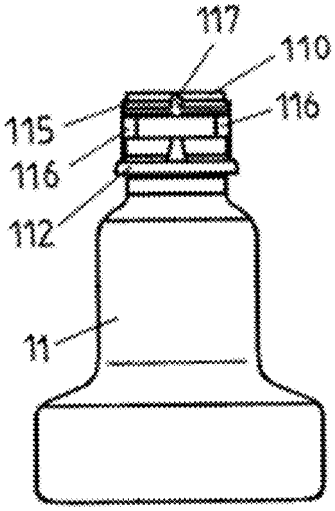
FIG. 8A is a front view of the connector shown in FIG. 3.
Figure 8B:
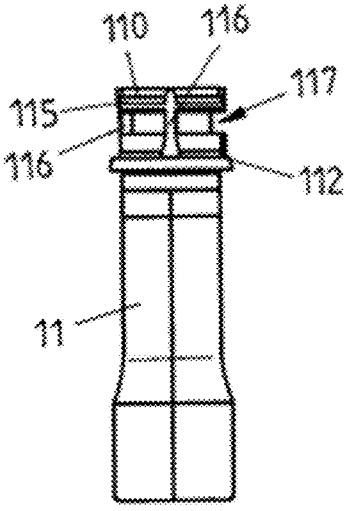
FIG. 8B is a side view of the connector shown in FIG. 8A.

When the attachment member 2 is attached to the connector 11, the sealing element 4 is disposed between attachment member 2 and connector 11. In particular, the sealing element 4 can be held in a clamping manner between the attachment member 2 and the connector 11. Prior to attachment of the attachment member 2 to the connector 11, the sealing element 4 can be inserted in an insertion direction E (shown in FIG. 6) into the opening 210 of the attachment member 2. The sealing element 4, as shown in FIG. 7, can be formed as a rotationally symmetrical body. The sealing element 4 can have a sealing head 40, which is configured to be received by an engagement opening 221 defined by the threaded portion 22 of the attachment member 2. The sealing element 4 can further include a convexly curved or flat side 400 that extends out past threaded portion 22 towards the detachable part 20 when the sealing element 4 is received within the engagement opening 221. Alternatively, the side 400 can be flush with the upper side of the threaded portion 22.

The sealing element 4 can also include a cylindrical section 41 that extends from the sealing head 40 to a circumferentially-extending shoulder 410. The shoulder 410 can be configured to extend circumferentially around a substantial entirety of the sealing element 4 and rest on a circumferential conical support surface 212 defined within the opening 210 of the attachment member 2 at the transition between the connection section 21 and the threaded portion 22. The cylindrical section 41 of the sealing element 4 can have a larger diameter than the sealing head 40. However, the shoulder 410 can project radially outward past cylindrical section 41. The sealing element 4 can also include a cylindrical body 42 that extends downwards from the shoulder 410 and is configured to be inserted into the opening 210 of the connection section 21. When the cylindrical body 42 is positioned within the opening 210, a clearance can be defined between the cylindrical body 42 and the connection section 21. In the depicted embodiment, the cylindrical body 42 has a smaller diameter than the shoulder 410. Since the cylindrical body 42 is inserted into the opening 210 with a clearance defined between the cylindrical body 42 and the circumferential wall of connection section 21, the sealing element 4 can be deformed in an advantageous manner by the attachment of delivery device 5 to create a flow of liquid through the sealing element 4 between the delivery device 5 and the container 1.

The cylindrical body 42 carries a circumferential flange 420 on an end facing away from the sealing head 40. The flange 420 can define a lower side 422 that is configured to rest on a support surface 114 of the connector 11. The flange 420 can also define an upper side 421 opposite the lower side that can be completely exposed and not engage any surface of the connector 11. Alternatively, the upper side 421 of the flange 420 can be only partially exposed. In this embodiment, when the sealing element 4 is disposed between the attachment member 2 and the connector 11, the flange 420 can be positioned between an annular projection 211 defined by the connection section 21 and the support surface 114 on the head 110 of the connector 11. As such, the flange 420 can be partially held in a clamping manner between annular projection 211 and the support surface 114 when the attachment member 2 is attached to the connector 11. In this embodiment, a radially outer section of the flange 420 is held by the attachment member 2 in a clamping manner.

Above the flange 420 or on a transition between the cylindrical body 42 and the flange 420, the cylindrical body 42 can define a recess 423 extending radially into the sealing element 4. The recess 423 can be configured to support the deformation of the sealing element 4 when the delivery device 5 is attached to the sealing element 4. The recess 423 can be formed by a step on the outer side of the cylindrical body 42. In cross section, the recess 423 can have an essentially flat bottom. For example, the recess 423 can have a box-like cross section. In this embodiment, the base and the radial opening of the recess 423 can have essentially the same dimensions (as viewed in insertion direction E). However, other configurations for the recess 423 are contemplated. The sealing element 4 can further comprise a foot section 43 that extends downwardly from the flange 420, which is configured to engage the recess 113 on the head 110 of the connector 11.

When attached to the connector 11, the connection section 21 of the attachment member 2 rests on the outer flange 112 of the connector 11. Since the sealing element 4 is supported on an upper side by an engagement between the shoulder 410 and the attachment member 2 and on a lower side by an engagement between the flange 420 and the support surface 114 of the connector 11, a defined, secured placement of the sealing element 4 within the opening 210 of the attachment member 2 can be guaranteed. The sealing element 4 can also define a cylindrical inner opening 44 that extends from the foot section 43, through the cylindrical body 42 and the cylindrical section 41, and to the sealing head 40. The cylindrical inner opening 44 can be open to the flow opening 118 of the connector 11, which allows a higher volume of flow between the delivery device 5 and the container 1 to be achieved when the delivery device 5 is attached to the attachment member 2. The cylindrical inner opening 44 can have a diameter in a range of from 1 mm to 5 mm, though other diameters are contemplated.

Figure 5:
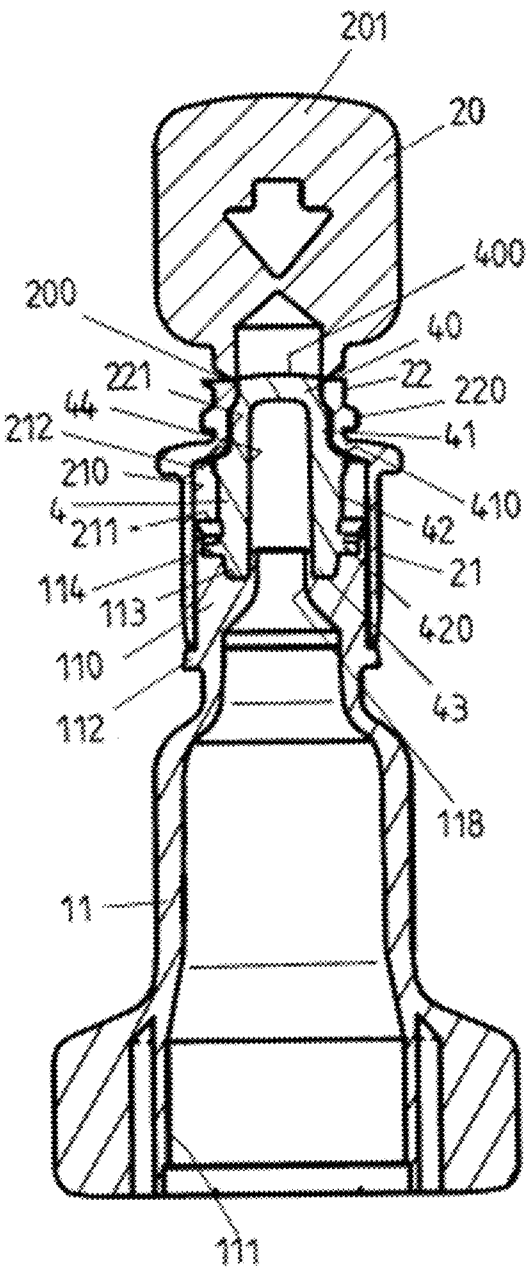
FIG. 5 is a cross-sectional view of the connector and attachment member shown in FIG. 3.
Figure 6:
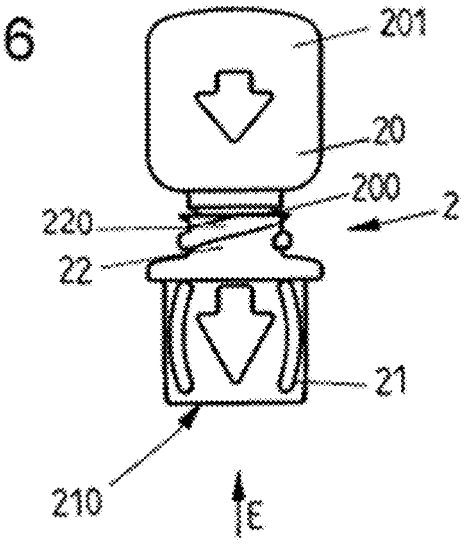
FIG. 6 is a front view of the attachment member shown in FIG. 3.

In an initial state, as represented in FIG. 5, the attachment member 2 is attached with the sealing element 4 to the connector 11, such that the interior of the connector 11 is fluidly closed off from the outside. In this initial state, the sealing element 4 is not accessible from the outside because the upper side 400 of the sealing head 40 is disposed within the engagement opening 221 of the threaded portion 22 of the attachment member 2, and is thus covered from the outside by the detachable part 20.

Figure 9:
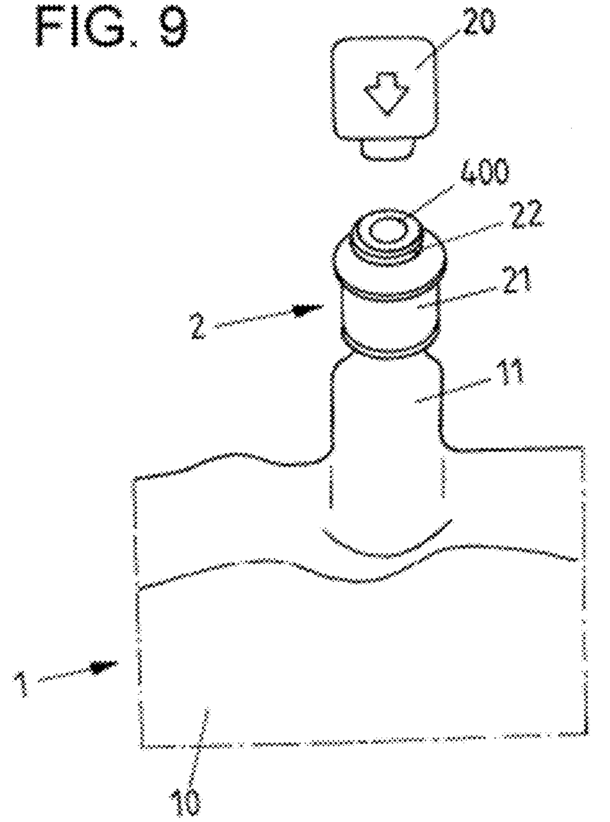
FIG. 9 is a perspective view of an attachment member shown in FIG. 3 on the connector, with the detachable part broken off.
Figure 10:
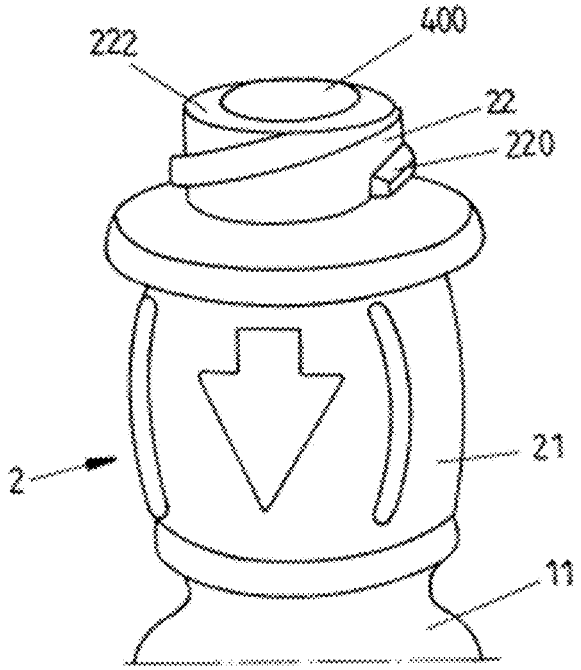
FIG. 10 is a perspective view of the attachment member shown in FIG. 3, with the detachable part broken off.
Figure 11:
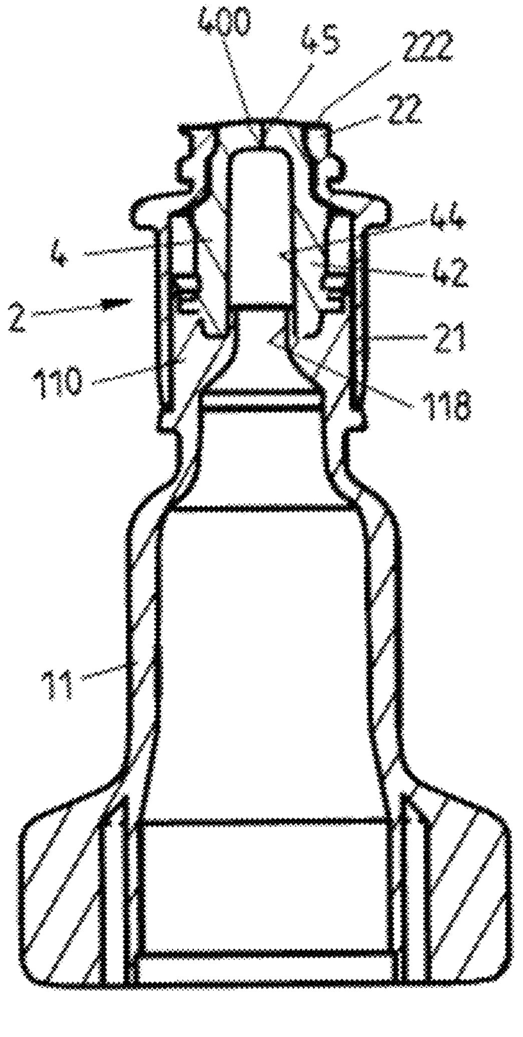
FIG. 11 is the sectional view according to FIG. 5, with the detachable part of the attachment member broken off.

The detachable part 20 of the attachment member 2 is connected to the threaded portion 22 via a predetermined breaking point 200. In one embodiment, the breaking point 200 take the form of a notch-like circumferential recess, though the present disclosure is not intended to be limited to such. In order to attach the delivery device 5 to the sealing element 4, and in this manner create an access to container 1 for filling it with a liquid, a user can break the detachable part 20 off of threaded portion 22 by gripping the handle element 201 of the detachable part 20 and applying a sufficient force to release the detachable part 20 from the threaded portion 22, as shown in FIG. 9. When the detachable part 20 is removed from the threaded portion 22, a portion of the attachment member 2 remains attached to the connector 11 without the detachable part 20, as is depicted in FIG. 10.

After breaking off the detachable part 20 from the threaded portion 22, the sealing element 4 can have its outward-facing side 400 on the sealing head 40 exposed. As a result, the outward-facing side 400 can be accessed from the outside. In one embodiment in which the side 400 is formed convexly and projects over the upper side 222 of the threaded portion 22 in a curved manner, the side 400 of the sealing element 4 can be wiped or dabbed off in an efficient manner in order to clean and disinfect the sealing element 4 in accordance with any legal requirements that may be present. Likewise, in another embodiment in which the side 400 is substantially flat, the side 400 can also be appropriately wiped or dabbed off in an efficient manner in order to clean and disinfect the sealing element 4.

Figure 12B:
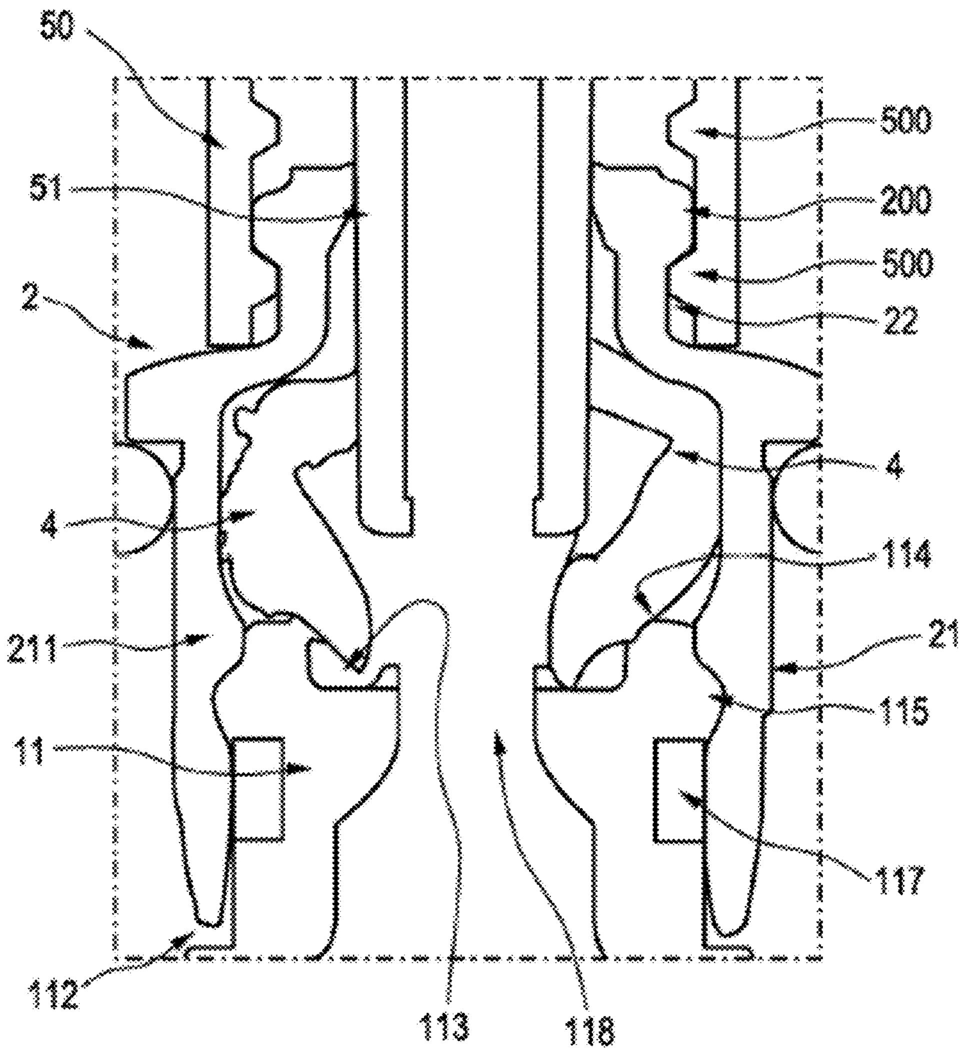
FIG. 12B a cross-sectional view of the delivery device shown in FIG. 12A connected to the connector.

After the side 400 has been cleaned, the delivery device 5 can, as shown in FIGS. 12A and 12B, be attached to threaded portion 22 by bringing the connection element 50 of the delivery device 5, which can comprise a nut or union nut, into contact with threads 220 of the threaded portion 22. In particular, threads 500 of the delivery device 5 can engage the threads 220 of the threaded portion 22 in a screw-like manner. The connecting piece 51 of the delivery device 5 can be inserted through the engagement opening 221 defined by the threaded portion 22 such that the connecting piece 51 presses on sealing head 40 of sealing element 4. First, the connecting piece 51 presses downward on the sealing head 40. Then, the connecting piece 51 opens the sealing head 40 at the slot opening 45 (see FIG. 11). As a result, the connecting piece 51 penetrates the sealing head 40 at the slot opening 45 and enters into liquid communication with the cylindrical inner opening 44 of the sealing element 4, which provides a flow path between the delivery device 5 and the flow opening 111 of the connector 11. The slot opening 45 can define a cross-shaped or straight slot design. However, other embodiments of the slot opening 45 are contemplated.

With the pressing of the connecting piece 51 into the engagement opening 221, the sealing head 40 is also pressed into the attachment member 2. The cylindrical section 41 and the cylindrical body 42 are forced aside into the available space radially between the cylindrical body 42 and the connection section 21 of the attachment member 2. When the connecting piece 51 is fully inserted through the sealing head 40, the connecting piece 51 creates a positive lock connection with the engagement opening 221 and extends through sealing head 40, which creates an efficient flow connection between connecting piece 51 and the flow opening 118 on the head 110 of the connector 11. The flow opening 118 is not affected, or is only marginally affected, by the sealing element 4. The delivery device 5 can extend to the greatest extent through the sealing element 4 when the delivery device 5 is in a fully attached state. The fully attached state can occur when the delivery device 5 is fully tightened in relation to the attachment member 2 with its connecting piece 51 through the slot opening 45 of the sealing element 4, such that a flow between the delivery device 5 and the container 1 can occur unhindered, or essentially unhindered, through the sealing element 4. The whole cross section of the opening in the delivery device 5, through which the liquid transport takes place, can be entirely exposed, as shown in FIG. 12B. In one embodiment, the delivery device 5 can have a syringe body 52 and a plunger 53, where the plunger 53 can be pushed into syringe body 52 in order to urge a liquid from the syringe body 52 into the container 1.

Because a slot opening 45 is provided in the sealing head 40 of the sealing element 4, a needle-free access into the container 1 is created. This needle-free access can thus be accessed via the delivery device 5, and without the use of an injection needle. When the delivery device 5 is attached to the attachment member 2, the connecting piece 51 achieves engagement with the slot opening 45, and in this manner opens the sealing element to create a flow between the delivery device 5 and the container 1. After removing the delivery device 5 from the attachment member 2, the sealing element 4 again closes automatically and seals itself, so that no liquid can escape from the container 1.

Figure 13:
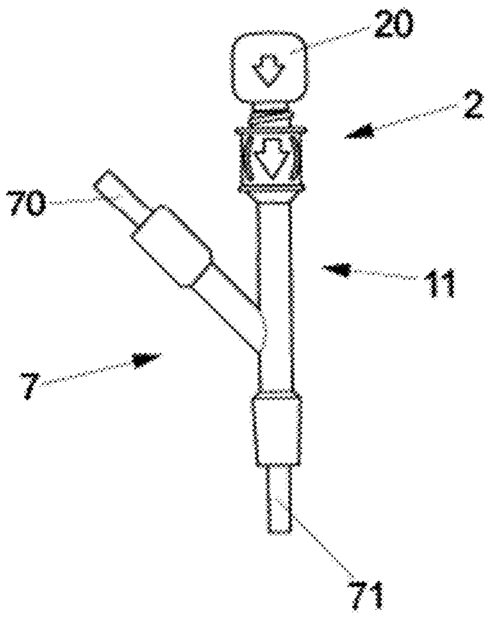
FIG. 13 a view of a connection assembly according to an embodiment of the present disclosure.
Figure 14:
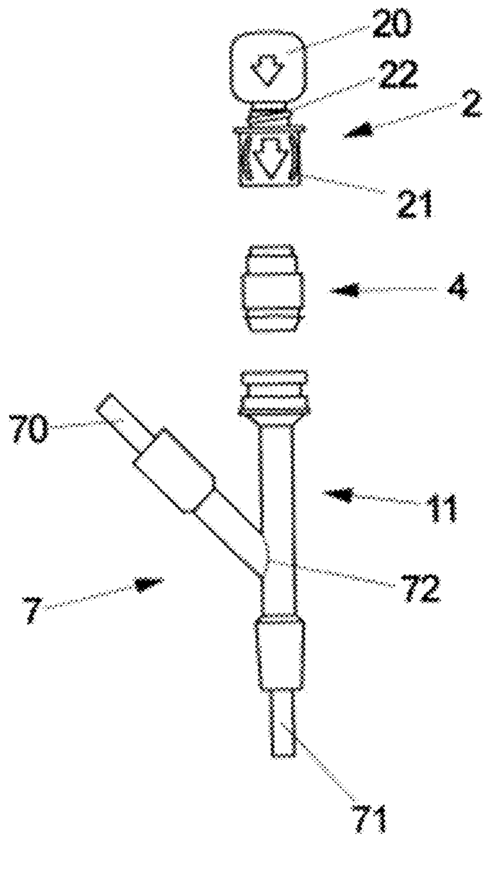
FIG. 14 is an exploded view of the connection assembly shown in FIG. 13.

FIGS. 13 and 14 show a further exemplary embodiment in which a connection assembly comprises the connector 11, the attachment member 2 arranged thereon, and the sealing element 4. In this embodiment, the connection assembly is a component of a connector 7, where the connector 7 takes the form of a y-connector. The connector 7 has two line connections 70, 71, each of which can be connected to a medical line that comprises an infusion tube or similar device. Line connections 70, 71 are in fluid connection with the connector 11 at a connection point 72, so that a liquid can be provided from a line system that is connected to the line connections 70, 71 or can be delivered to the line system via the connector 11.

The attachment member 2 is also arranged on the connector 11 in this exemplary embodiment, and the sealing element 4 is clamped between the attachment member 2 and the connector 11. As in the exemplary embodiments according to FIGS. 1 to 12, the threaded portion 22 of the attachment member 2 is connected to the detachable part 20, which can be broken off to connect a delivery device 5 (as shown in FIG. 12) to the threaded portion 22 and to further connect the delivery device 5 to the connector 11. In an embodiment in which the sealing element 4 includes a convex side 400, the sealing element 4 can protrude over the upper side 222 of the threaded portion 22 and thus be easily accessible. This allows the side 400 of the sealing element 4 to be easily be wiped off in order to disinfect the outward-facing side 400 of the sealing element 4 before attaching the delivery device 5. In an embodiment in which the sealing element 4 includes a flat side 400, the side 400 can also be appropriately wiped or dabbed off. In the embodiment shown in FIGS. 13 and 14, the connector 11 and the attachment member 2 are identical in form and function to those previously described for the exemplary embodiment according to FIGS. 1 to 12B.

Figure 15:
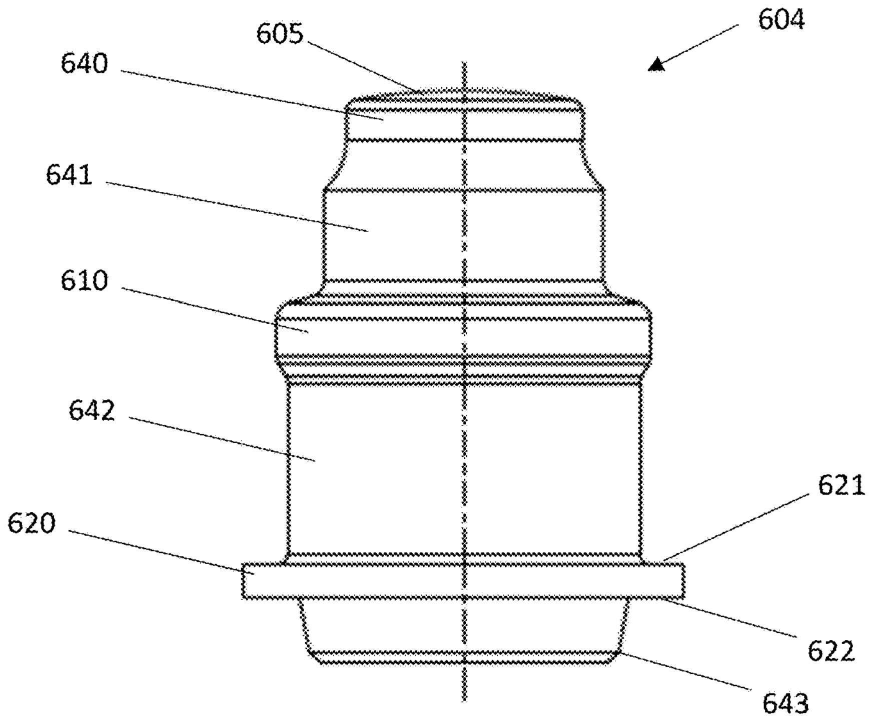
FIG. 15 is an a side view of a sealing element according to another embodiment of the present disclosure.
Figure 16:
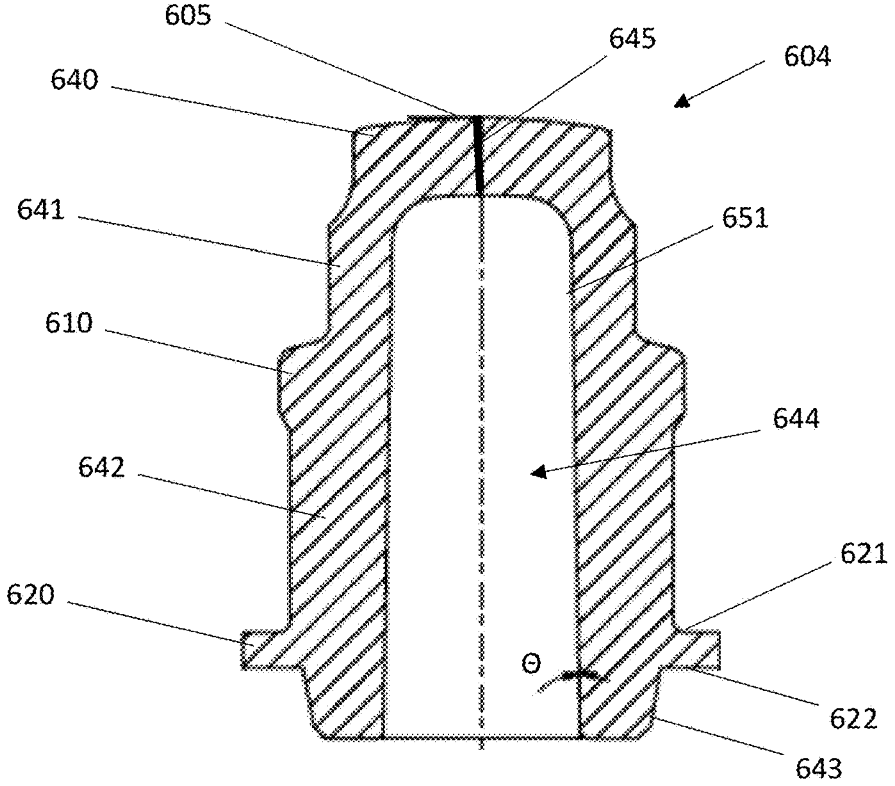
FIG. 16 is a side cross-sectional view of the sealing element shown in FIG. 15.
Figure 17:
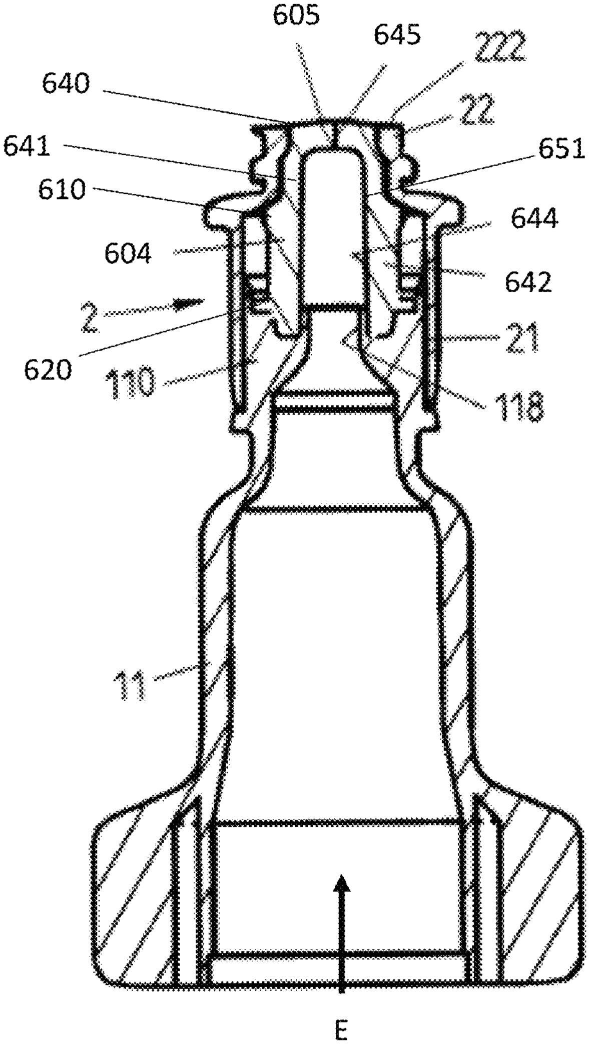
FIG. 17 is a cross-sectional view of a connection assembly incorporating the sealing element shown in FIG. 16.

Continuing with FIGS. 15-17, another embodiment of a sealing element 604 is depicted. The sealing element 604 can be configured to be disposed between and attached to the first connector 11 and the attachment member 2 in substantially the same way as the connector 4 as described above. As such, parts of the disclosure related to the engagement between the sealing element 604, the first connector 11, and the attachment member 2 will not be duplicated here.

The sealing element 604 can be formed having rotationally symmetrical body. The sealing element 604 can have a sealing head 640, which is configured to be received by the engagement opening 221 defined by the threaded portion 22 of the attachment member 2. The sealing element 604 can include a side 605 that extends out past the threaded portion 22 of the attachment member 2 when the sealing element 4 is received within the engagement opening 221. In one embodiment, the side 605 is convexly curved and extends out past the threaded portion 22 towards the detachable part 20 when the sealing element 4 is received within the engagement opening 221. In another embodiment, the side 605 can be flush with the upper side of the threaded portion 22. When the side 605 is exposed after the detachable part 20 of the attachment member 2 is broken from the threaded portion 22, the side 605 can be wiped or dabbed off in an efficient manner in order to clean and disinfect the sealing element 4 in accordance with any legal requirements that may be present.

The sealing element 604 can include a cylindrical section 641 that extends from the sealing head 640 to a circumferentially-extending shoulder 610. The shoulder 610 can be configured to extend circumferentially around a substantial entirety of the sealing element 604 and rest on the circumferential conical support surface 212 of the attachment member 2. The cylindrical section 641 of the sealing element 604 can have a larger outer diameter than the outer diameter of the sealing head 640. However, the shoulder 610 can define a larger outer diameter than the outer diameter of the cylindrical section 641. The sealing element 604 can also include a cylindrical body 642 that extends downwards from the shoulder 610 to a flange 620, which will be described below, along the insertion direction E. As depicted, the cylindrical body 642 defines a substantially constant diameter measured perpendicular to the insertion direction E from the flange 620 to the shoulder 610. The cylindrical body 642 can be configured to be inserted into the opening 210 of the connection section 21 of the attachment member 2. When the cylindrical body 642 is positioned within the opening 210, a clearance can be defined between the cylindrical body 642 and the connection section 21, which allows the cylindrical body 642 to deform to create a flow path through the sealing element 604. The outer diameter of the shoulder 610 can be greater than the outer diameter of the cylindrical body 642.

Continuing with FIGS. 15-17, the flange 620 of the sealing element 604 can extend radially from the sealing element 604. The flange 620 can define a lower surface 622 configured to engage a support surface 114 of the connector 11. The flange 620 can also define an upper surface 621 opposite the lower surface that is completely exposed, such that the upper surface 621 does not engage any portion of the connector 11. Alternatively, the upper surface 621 can be only partially exposed. In this embodiment, when the sealing element 604 is disposed between the attachment member 2 and the connector 11, the flange 620 can be positioned between the annular projection 211 and the support surface 114. As such, the flange 620 can be partially held in a clamping manner between annular projection 211 and the support surface 114 when the attachment member 2 is attached to the connector 11. In this embodiment, a radially outer section of the flange 620 is held by the attachment member 2 in a clamping manner. The flange 620 can have an outer diameter that is greater than the outer diameter of the shoulder 610 and the cylindrical body 642.

Additionally, the sealing element 604 can further comprise a foot section 643 that extends downwardly from the flange 620, where the foot section 643 is configured to be received by the recess 113 of the connector 11. The sealing element 604 can further include an inner opening 644 that extends through the foot section 643, through the cylindrical body 642, and through the cylindrical section 641 to the sealing head 640. The inner opening 644 can be open to the flow opening 118 of the connector 11, which allows a higher volume of flow between the delivery device 5 and the container 1 to be achieved when the delivery device 5 is attached to the attachment member 2. The inner opening 644 can have a diameter in a range of from 1 mm to 5 mm, though other diameters are contemplated. The inner opening 644 can slightly expand as it extends downward along the insertion direction E. As depicted, the inner surface 651 of the sealing element 604 that defines the inner opening 644 can be slightly conical. In some embodiments, the inner surface 651 of the sealing element 604 that defines the inner opening 644 can define an angle Θ relative to the insertion direction E. The angle Θ can be about 0.5 degrees or more, 0.8 degrees or more, 1.0 degree or more, 1.5 degrees or more, 2.0 degrees or more, 5.0 degrees or more, 8.0 degrees or more, 10 degrees or more, or 15 degrees or more. In other embodiments, the angle Θ can be about 20 degrees or less, e.g., 15 degrees or less, 12 degrees or less, 8.0 degrees or less, 6.0 degrees or less, or 3.0 degrees or less. In yet other embodiments, the angle Θ can be in the range of 0.5-15 degrees, 0.5-8.0 degrees, 0.8-5.0 degrees, 0.8-3.0 degrees, or 1.0-2.0 degrees. However, other angles, and thus other degrees of widening of the inner opening 644, are contemplated. Alternatively, the inner opening 644 may define a substantially constant diameter along its length.

After the side 605 has been cleaned, the connecting piece 51 of the delivery device 5 is inserted through the engagement opening 221 defined by the threaded portion 22 such that the connecting piece 51 presses on the sealing head 640. With the pressing of the connecting piece 51 into the engagement opening 221, the sealing head 640 is also pressed into the attachment member 2. The cylindrical section 641 and the cylindrical body 642 are forced aside into the available space radially between the cylindrical body 642 and the connection section 21 of the attachment member 2. As a result, the opening 645 is configured to transition from a closed state to an open state when the cylindrical body 642 deforms. When the opening 645 is in an open state, the opening 645 and the inner opening 644 of the sealing element 604 define a flow path through the sealing element 604 that allows fluid communication between the delivery device 5 and the container 1. The opening 645 can define a cross-shaped design, a straight slot design, or any other design as desired. When the connecting piece 51 is fully inserted through the sealing head 640, the connecting piece 51 creates a positive lock connection with the engagement opening 221 and extends through sealing head 640, which creates an efficient flow connection between connecting piece 51 and the flow opening 118 on the head 110 of the connector 11. The flow opening 118 is not affected, or is only marginally affected, by the sealing element 604. The delivery device 5 can extend to the greatest extent through the sealing element 604 when the delivery device 5 is in a fully attached state. The fully attached state can occur when the delivery device 5 is fully tightened in relation to the attachment member 2 with its connecting piece 51 through the slot opening 645 of the sealing element 604, such that a flow between the delivery device 5 and the container 1 can occur unhindered, or essentially unhindered, through the sealing element 604.

Because an opening 645 is provided in the sealing head 640 of the sealing element 604, a needle-free access into the container 1 is created. This needle-free access can thus be accessed via the delivery device 5, and without the use of an injection needle. When the delivery device 5 is attached to the attachment member 2, the connecting piece 51 achieves engagement with the slot opening 645, and in this manner opens the sealing element to create a flow between the delivery device 5 and the container 1. After removing the delivery device 5 from the attachment member 2, the sealing element 604 again closes automatically and seals itself, so that no liquid can escape from the container 1.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. A sealing element configured to be received between a connector and an attachment member, the sealing element comprising:

a shoulder configured to engage an inner surface of the attachment member;

a flange having a lower surface extending radially along a lateral axis transverse to a longitudinal axis of the sealing element, the lower surface being configured to rest directly on a support surface of the connector;

a foot section extending longitudinally from the flange, the foot section being configured to be received within a recess defined by the support surface of the connector;

a cylindrical body extending longitudinally from the shoulder to the flange, an outer diameter of the cylindrical body having a substantially constant diameter; and a sealing head extending longitudinally from the shoulder, the sealing head defining an opening that is configured to transition from a closed state to an open state when the cylindrical body deforms; and a cylindrical section extending longitudinally from the sealing head to the shoulder, wherein an outer diameter of cylindrical section is smaller than the outer diameter of the cylindrical body, wherein an outer diameter of the shoulder is larger than the outer diameter of the cylindrical body, and wherein an outer diameter of the flange is larger than an outer diameter of the foot section.

2. The sealing element of claim 1, wherein an outer diameter of the sealing head is smaller than the outer diameter of the cylindrical section.

3. The sealing element of claim 1, wherein the outer diameter of the flange is greater than the outer diameter of the shoulder.

4. The sealing element of claim 1, wherein the cylindrical body is configured to deform radially outward when a portion of a delivery device is pushed through the opening of the sealing head.

5. The sealing element of claim 1, wherein the sealing head has an outer surface that is substantially flat or convex.

6. The sealing element of claim 1, further comprising:

an inner opening that extends longitudinally through the foot section, the cylindrical body, and the cylindrical section to the sealing head, wherein the inner opening and the opening of the sealing head define a flow path through the sealing element when the cylindrical body deforms.

7. The sealing element of claim 6, wherein the inner opening defines an angle greater than zero relative to central axis of the sealing element.

8. The sealing element of claim 6, wherein the inner opening defines an angle less than six degrees relative to central axis of the sealing element.

9. The sealing element of claim 1, wherein the shoulder extends circumferentially around a substantial entirety of the sealing element.

10. The sealing element of claim 1, wherein the foot section is substantially perpendicular to the lower surface of the flange.

11. The sealing element of claim 1, wherein the outer diameter of the flange is substantially constant.

12. The sealing element of claim 1, wherein the flange has an upper surface that is at least partially exposed.

13. A connection assembly configured to deliver a liquid from a delivery device to a container, the connection assembly comprising:

a connector having a support surface that defines a recess, the connector being configured to connect to the container;

an attachment member having an inner surface, a lumen, a first end configured to be connected to the delivery device, and a second end connected to the connector; and a sealing element disposed in the lumen between the connector and the attachment member, the sealing element comprising:

a shoulder configured to engage the inner surface of the attachment member;

a flange having a lower surface extending radially along a lateral axis transverse to a longitudinal axis of the sealing element, the lower surface resting directly on the support surface of the connector;

a foot section extending longitudinally from the flange, the foot section being received within the recess defined by the support surface of the connector;

a cylindrical body extending longitudinally from the shoulder to the flange, an outer diameter of the cylindrical body having a substantially constant diameter; and a sealing head extending longitudinally from the shoulder, the sealing head defining an opening that is configured to transition from a closed state to an open state when the cylindrical body deforms; and a cylindrical section extending longitudinally from the sealing head to the shoulder, wherein an outer diameter of cylindrical section is smaller than the outer diameter of the cylindrical body, wherein an outer diameter of the shoulder is larger than the outer diameter of the cylindrical body, and wherein an outer diameter of the flange is larger than an outer diameter of the foot section.

14. The connection assembly of claim 13, wherein the flange of the sealing element has an upper surface that is at least partially exposed.

15. The connection assembly of claim 13, wherein the cylindrical body of the sealing element is spaced radially from the attachment member so as to allow for the outward radial deformation of the cylindrical body.

16. The connection assembly of claim 13, wherein the sealing head is configured to be disposed in an opening of the attachment member.

17. The connection assembly of claim 13, wherein the attachment member further comprises:

a first section configured to receive the sealing head of the sealing element; and a detachable part configured to be detached from the first section such that the delivery device can be attached to the attachment member.

18. The connection assembly of claim 17, wherein the first section and the detachable part are integrally formed.

19. The connection assembly of claim 17, wherein the attachment member further comprises:

a predetermined breaking point for detaching the detachable part from the first section.

20. The connection assembly of claim 13, wherein an outer diameter of the sealing head of the sealing element is smaller than the outer diameter of the cylindrical section of the sealing element.

21. The connection assembly of claim 20, wherein the outer diameter of the flange of the sealing element is greater than the outer diameter of the shoulder.

22. The connection assembly of claim 13, wherein the cylindrical body of the sealing element is configured to deform radially outward when a portion of the delivery device is pushed through the opening of the sealing head.

23. The connection assembly of claim 13, wherein the sealing head of the sealing element has an outer surface that is substantially flat or convex.

24. The connection assembly of claim 13, wherein the shoulder extends circumferentially around a substantial entirety of the sealing element.

25. The connection assembly of claim 13, wherein the foot section is substantially perpendicular to the lower surface of the flange.

26. The connection assembly of claim 13, wherein the outer diameter of the flange is substantially constant.

27. The connection assembly of claim 13, wherein the sealing element further comprises:

an inner opening that extends longitudinally through the foot section, the cylindrical body, and the cylindrical section to the sealing head, wherein the inner opening and the opening of the sealing head define a flow path through the sealing element when the cylindrical body deforms.

28. The connection assembly of claim 27, wherein the inner opening defines an angle less than six degrees relative to central axis of the sealing element.

* * * * *